United States Patent
Carpenter et al.

(10) Patent No.: US 10,846,526 B2
(45) Date of Patent: Nov. 24, 2020

(54) CONTENT BASED TRANSFORMATION FOR DIGITAL DOCUMENTS

(71) Applicant: Microsoft Technology Licensing, LLC, Redmond, WA (US)

(72) Inventors: Maria Carpenter, Snohomish, WA (US); Shikha Devesh Desai, Bellevue, WA (US); Robin Wakefield, Seattle, WA (US); Rebecca Poulson, Seattle, WA (US); Maria del Mar Gines Marin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/836,467

(22) Filed: Dec. 8, 2017

(65) Prior Publication Data
US 2019/0180098 A1    Jun. 13, 2019

(51) Int. Cl.
*G06F 17/00*    (2019.01)
*G06K 9/00*    (2006.01)
(Continued)

(52) U.S. Cl.
CPC ........ *G06K 9/00469* (2013.01); *G06F 40/117* (2020.01); *G06F 40/131* (2020.01);
(Continued)

(58) Field of Classification Search
CPC ...... G06F 17/24; G06F 17/211; G06F 17/212; G06F 17/248; G06F 40/131; G06K 9/00469
See application file for complete search history.

(56) References Cited

U.S. PATENT DOCUMENTS

| 7,764,830 B1 | 7/2010 | Wnek |
| 8,126,837 B2 | 2/2012 | Stollman |

(Continued)

FOREIGN PATENT DOCUMENTS

| EP | 1748365 A1 | 1/2007 |
| WO | 2016053924 A1 | 4/2016 |

OTHER PUBLICATIONS

"International Search Report and Written Opinion Issued in PCT Application No. PCT/US2018/062381", dated Feb. 20, 2019, 13 Pages.

(Continued)

*Primary Examiner* — Andrew T McIntosh (57) ABSTRACT

Non-limiting examples of the present disclosure describe transformation of content of a digital document on behalf of a user of an application/service. Examples describes herein extend to instances where an existing digital document (e.g. content portion) is transformed as well as examples where templatized transformations are used to create a digital document. As an example, content of a digital document may be converted into preset document format representations which are generated and suggested automatically to the user through a user interface of a productivity service or through an alternative modality (e.g. message, email, notification, etc.). This improves processing efficiency of computing devices associated with productivity services, for example, by enabling efficient digital document management through proactive contextual analysis, reducing the number of processing operations for users in real-time and reducing latency at run-time, among other examples.

20 Claims, 9 Drawing Sheets

(51) Int. Cl.
*G06F 40/117* (2020.01)
*G06F 40/131* (2020.01)
*G06F 40/186* (2020.01)
*G06F 40/205* (2020.01)
*G06F 40/295* (2020.01)

(52) U.S. Cl.
CPC .......... *G06F 40/186* (2020.01); *G06F 40/205* (2020.01); *G06F 40/295* (2020.01); *G06K 9/00483* (2013.01)

(56) References Cited

U.S. PATENT DOCUMENTS

| | | | |
|---|---|---|---|
| 8,620,079 B1 | 12/2013 | Rubio et al. | |
| 8,959,109 B2 | 2/2015 | Scott et al. | |
| 2002/0013792 A1* | 1/2002 | Imielinski | G06F 40/14 715/239 |
| 2004/0103367 A1 | 5/2004 | Riss et al. | |
| 2007/0168382 A1 | 7/2007 | Tillberg et al. | |
| 2008/0281578 A1* | 11/2008 | Kumaran | G06F 17/28 704/2 |
| 2011/0249284 A1* | 10/2011 | Seabright | G06F 3/1206 358/1.13 |
| 2013/0110950 A1 | 5/2013 | Martine et al. | |
| 2015/0058349 A1 | 2/2015 | Ramnani et al. | |
| 2017/0116179 A1* | 4/2017 | Gagne-Langevin | G06F 17/24 |
| 2017/0220544 A1 | 8/2017 | Masson et al. | |

OTHER PUBLICATIONS

Yu, et al., "Resume Information Extraction with Cascaded Hybrid Model", In Proceedings of the 43rd Annual Meeting on Association for Computational Linguistics, Jun. 25, 2005, pp. 499-506.

* cited by examiner

RESUME.doc — 220, 202

JOHN SMITH
*Touch & Go*
*Senior Vice President, Principal*

Jsmith@T&G.net

300 Santana Row
Redmond, WA 98008
425-896-1254

*Page 1 of 1* — 222

Objective: *Seeking Company President Position* — 224

Job Experience

- Touch & Go, Senior Vice President, Principal *(January 2012-Present)*
  *Carrying out strategic planning and overseeing operations, developing functional roles and assigning responsibilities to employees*

- One Stop, Assistant Vice President *(March 2009-January 2012)*
  *Project management operations, communication and documentation for committee meetings*

— 226

Hobbies: Rock Climbing, Curling, Volunteering — 228

CONTENT BASED TRANSFORMATION FOR DIGITAL DOCUMENTS

BACKGROUND

Creation and update of files requires significant manual management by users. Users are required to create and tailor documents, which occurs through numerous processing operations that need to be processed by computing devices and related applications/services. Consider an example where a user is creating different versions of a resume for different job types where structure and format of the resumes may be different. A user would have to create and manage a number of different versions of its resume. Furthering that example, job postings may present specific constraints on formatting of resume. For instance, a job posting may limit resumes to only one page. This may present additional challenges for a user to adapt formatting, layout and content as well as provide an added amount of processing for a computing device used for creation and/or updating of such documents. Applications are becoming smarter, especially in service based examples with access to different data sources and added processing capabilities/resources. As such, there is a need to enhance processing related to content transformation to improve operation of application/services as well as computing devices that execute such applications/services.

SUMMARY

Non-limiting examples of the present disclosure describe transformation of content of a digital document on behalf of a user of an application/service. Examples describes herein extend to instances where an existing digital document (e.g. content portion) is transformed as well as examples where templatized transformations are used to create a digital document. As an example, content of a digital document may be converted into preset document format representations which are generated and suggested automatically to the user through a user interface of a productivity service or through an alternative modality (e.g. message, email, notification, etc.). This improves processing efficiency of computing devices associated with productivity services, for example, by enabling efficient digital document management through proactive contextual analysis, reducing the number of processing operations for users in real-time and reducing latency at run-time, among other examples.

In one example, a digital document is accessed. The digital document is analyzed by a content transformation component. The content transformation component is configured to identify a data structure of the digital document. The content transformation component is further configured to analyze specific content portions associated with the identified data structure and classify the digital document. For example, the digital document may be classified based on the identified data structure and an analysis of the specific content portions of the digital document. A schema for transformation of one or more content portions of the digital document may be generated based on: the identified data structure, the analysis of the specific content portions of the digital document and a classification of the digital document. In some examples, other signal data may further be utilized to assist with generation of the schema for data transformation. Examples of other signal data may comprise but are not limited to: telemetric data, user specific data and/or usage data from other applications/services (e.g. other platform services and/or third-party services).

The content transformation component may be configured to apply a data model generates one or more templatized data transformations for creation or update of a digital document. For instance, a templatized data transformation may alter, for a content portion, one or more of: a formatting of content, a layout of the content, an arrangement (or ordering) of the content and add/remove content including text data and/or rich data format, among other examples. As identified above, exemplary templatized data transformations may be preset document format representations which are generated and suggested automatically to the user through a user interface of a productivity service or through an alternative modality (e.g. message, email, notification, etc.). One or more content portions of a digital document may be created/transformed based on the generated schema, where a data transformation of the one or more content portions may be surfaced through a user interface of an exemplary productivity service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Non-limiting examples of the present disclosure describe transformation of content of a digital document on behalf of a user of an application/service. Examples describes herein extend to instances where an existing digital document (e.g. content portion) is transformed as well as examples where templatized transformations are used to create a digital document. As an example, content of a digital document may be converted into preset document format representations which are generated and suggested automatically to the user through a user interface of a productivity service or through an alternative modality (e.g. message, email, notification, etc.). This improves processing efficiency of computing devices associated with productivity services, for example, by enabling efficient digital document management through proactive contextual analysis, reducing the number of processing operations for users in real-time and reducing latency at run-time, among other examples.

As an example, content of a digital document may be converted into preset document format representations (e.g. templatized representation) which are generated and suggested automatically to the user through a user interface of a productivity service or through an alternative modality (e.g. message, email, notification, etc.). This enables the user to select whether to transform a digital document with a suggested transformation. In other examples, transformations of content may be automatically applied to a digital document on behalf of users so that users do not need to bother to set the right format representation of the content. An exemplary user interface of a productivity application/service may be configured to provide user interface features that enable users to efficiently select whether to implement changes, view insights as to why transformations were suggested and/or rollback applied changes. In some examples, a new version of a digital document may be created from an existing digital document that comprises suggested modifications.

Examples describes herein extend to instances where an existing digital document (e.g. content portion) is transformed as well as examples where templatized transformations are used to create a digital document. In one example, an exemplary templatized transformation may be presented for one or more content portions of an existing digital document. In another instance, content may be retrieved from one application/service, transformed (into a templatized representation) and inserted into another application/service. In further examples, a new digital document may be created that comprises one or more of the templatized transformations of content on behalf of a user.

Accordingly, the present disclosure provides a plurality of technical advantages, among other examples, that include but not limited to: automatic transformation of content to a form that is tailored for a digital document, content mobility for data objects across different content portions and/or applications/services, improved processing efficiency (e.g. reduction in processing cycles, reduction in latency, better management of storage/memory of computing devices) for computing devices that are utilized for data transformations across different contexts, generation and utilization of an exemplary processing model that is usable by and scalable with any type of productivity service to implement processing operations described herein, and improved user interaction and productivity with front-end user interfaces when using exemplary applications/services, for example, where an exemplary productivity application/service may be configured to implement functionality described herein to enhance the user interface and improve user interaction with the productivity application/service.

Figure 1:
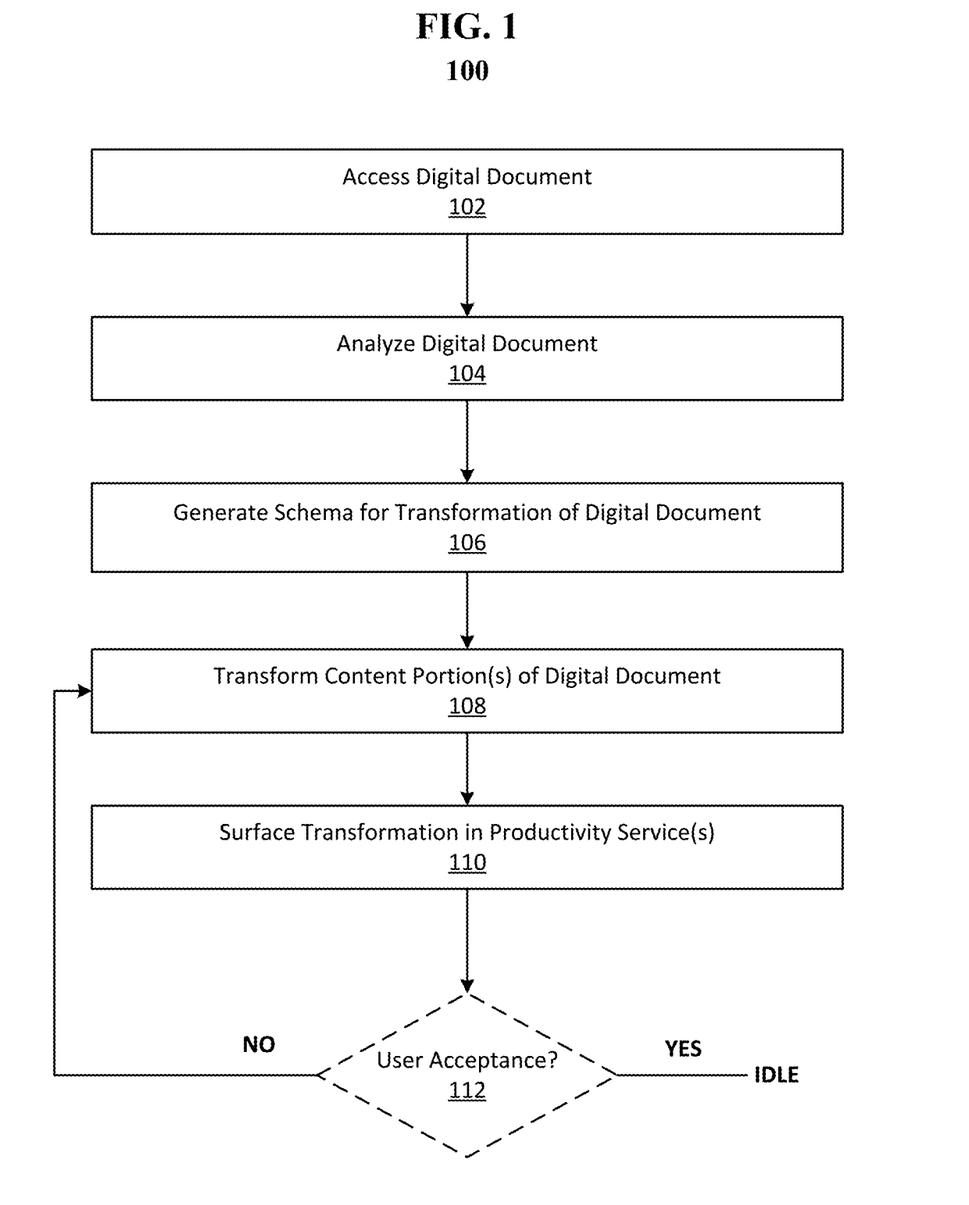
FIG. 1 illustrates an exemplary method related to suggestive transformation of content with which aspects of the present disclosure may be practiced.

FIG. 1 illustrates an exemplary method 100 related to suggestive transformation of content with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing and semantic and entity understanding modeling, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where an exemplary digital document is accessed. A digital document may be existing electronic content presented through an exemplary application/service. A digital document may comprise but is not limited to: an electronic file, website, social networking post, word documents, notes, documents, spreadsheet documents, blogs, etc. For instance, content of a digital document may be analyzed to transform one or more content portions of the digital document to a different representation that is usable to update that specific digital document or another digital document of an application/service.

An exemplary application/service is a productivity service. An exemplary productivity application/service is an application/service configured for execution to enable users to complete tasks on a computing device. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g. Microsoft® Office365® or the like). Further, an exemplary productivity service may be configured to interface with other internet sources/services including third-party application/services, for example, to enhance functionality of the productivity service.

In examples, access (processing operation 102) to a digital document may be made by a content transformation component that is executed by an application/service for the digital document or another application/service that is interfacing with an application/service associated with a digital document. Access to a digital document is known to one skilled in the art. In one example, processing operations and functionality described herein is programmed into an exemplary application/service. In another example, an application programming interface (API) may be configured to enable a service, running the content transformation component, to access a digital document.

Flow of method 100 may proceed to processing operation 104, where the digital document is analyzed. Analysis of the digital document comprises determination of a context of the digital document and associated data. Processing operations described herein may be configured to evaluate intent associated with creation of a digital document (or access to specific content of a digital document), which can be useful for suggestion of data transformations. Analysis (processing operation 104) of a digital document may be execute by an exemplary content transformation component. An exemplary content transformation component may be configured to employ one or more data models (or software algorithms) that analyze the digital document for generation of data transformations of content portions of the digital document. An exemplary data model may be generated specifically for analyzing digital documents or existing data models, provided by other application/services, may be accessed where parameters and results from the data model can be customized for content transformation. Examples of types of analysis that may be executed by a content transformation component comprise but are not limited to: data understanding processing (e.g. natural language understanding models, word models, input recognition processing including text/word recognition, optical character recognition processing, image recognition, facial recognition, voice recognition, etc.) and entity data models. Such exemplary models may be further extensible to interface with other data sources to enhance semantic analysis, where data sources may be associated with a specific platform or third-party services, among other examples.

In analyzing the digital document, the content transformation component evaluates: data and metadata associated with the digital document, data structure of the digital document and/or signal data. Signal data may be collected from usage of applications/services and be aggregated and analyzed at an application level, user-level, group level (e.g. group of users, channels, etc.). Processing operation 104 may comprise processing that parses data and metadata associated with a digital document to identify a breakdown of content within a digital document. Identification of data structure may comprise identification of formatting and layout of content within the digital document (e.g. title, headings, sections, sub-sections, different types of content, formatting and arrangement, etc.). Analysis of a data structure may comprise evaluation of: metadata associated with the format of the digital document, timestamp data, identification of where the document starts/ends (as well as identification of specific content portions within the digital document), layout and formatting of content and specific types of content within the digital document, among other examples.

In processing operation 104, an exemplary content transformation component is further configured to analyze specific content portions associated with the identified data structure. For instance, entity evaluation may occur on content within identified data structures of the digital document. Semantic analysis of the entities may be executed to best understand a context for content of the digital document. As a non-limiting example, a data structure may be a section of a digital document. Consider an instance where a digital document is a resume and a section is created to identify job experience for a subject. Processing operations may tag entities associated with the section (e.g. job experience) and map specific content to those tagged entities. Identification as a section as being related to job experience and also understanding the content provided within that section is useful to assist the content transformation component in best determination how to transform that data section.

Further, processing operation 104 may further comprise operations for classification of the digital document. As an example, a digital document may be classified based on the identified data structure and an analysis of the specific content portions. An exemplary content transformation component is configured to parse data and metadata of a digital document, for example, to classify the digital document, among other aspects of analysis. Classification of the digital document comprises may comprise determining a document type for the digital document. Identification of a document type may be used as a parameter to determine a most appropriate transformation of a content portion of a digital document. Moreover, classification of a digital document may comprise any one or more of: identification of a format of for a digital document (e.g. word document, spreadsheet, presentation, webpage, etc.), contextual analysis that may include defining contextual relevance of the digital document (e.g. is it a resume document, a task list, a social networking profile, accounting spreadsheet, etc.) and domain specific analysis of the digital document (e.g. if it is a resume, what type of resume is it, is it intended for a specific audience, etc.).

In some instances, contextual analysis of a digital document may further comprise analyzing an overall context or state of a computing device. For example, the data transformation component may be configured to interface with a computing device and/or other applications/services to identify digital documents that are (open, recently accessed, etc.), context of received messages, emails (e.g. a request for resume for a specific job posting) as well as applications/services that are being accessed. That is, signal data may be collected from different applications/services (and in some cases telemetrically analyzed) to assist the data transformation component with tailoring data transformations for a context that a user is working with. An exemplary model, executed by the data transformation component, may be configured to account for such signal data. This may assist the data transformation component with select a level of transformation that is most appropriately tailored to a specific context. For example, a user may be creating a resume document for a specific job posting, where the company that the user is applying to has resume requirements that are submitted to the user through an email or presented on a website that the user is viewing. Collection of signal data and interfacing between applications/services is known to one skilled in the art. In one instance, such signal data may be acquired through APIs. It is to be understood that data is collected in accordance with user consent and privacy laws.

Flow of method 100 may proceed to processing operation 106, where a schema is generated for transformation of one or more content portions of the digital document. An exemplary schema may correspond to results processing that factors in analysis as described in the foregoing. In one example, a schema may correspond to a selection of an exemplary templatized data transformation. Given that digital documents may be very complex with multiple levels of section embeddedness, intermediate paragraphs, and non-standard content, etc., it may be difficult for an exemplary model to properly identify every single section/entity in a digital document. As such, results of analyzing different data inputs may yield a determination that selects one of a plurality of different levels of transformative updates. Levels of transformative updates (e.g. specific templatized data transformations) may vary. Developers may correspond specific templatized data transformations to specific threshold determinations depending on results of data processing by an exemplary model. For instance, different templatized data transformations may correspond to different levels of update for a content portion. Exemplary templatized data transformations may vary the level of update that comprises any of: altering a formatting of content (of a content portion), altering a layout of the content and altering an arrangement of the content (e.g. prioritizing certain content or content portions based on the contextual analysis of the digital document). Further, an exemplary schema may further identify for inconsistencies, errors, etc., in content portions of a digital document. Basic processing operations for selection of an output of data model processing (i.e. selecting a specific templatized data transformation) is known to one skilled in the art of data modeling. Further, exemplary data models may be adaptive (e.g. learning models) that can continuously update based over time based on the presentation of new data and/or training of the data model.

Flow of method 100 may proceed to processing operation 108. At processing operation 108, one or more content portions of the digital document are transformed. For example, a transformation (processing operation 108) of one or more content portions of a digital document may correspond with a specific templatized data transformations, for example, selected in processing operation 106. In one example, a data transformation of a content portion may be applied to the digital document. In an alternative example, a templatized version of the content portion may be created, where the templatized version is usable for insertion into any of a plurality of digital documents (e.g. already existing or subsequently created). Examples of templatized transformations are illustrated in the examples provided in FIGS. 2A-2D.

At processing operation 110, an exemplary transformation of a content portion of a digital document is surfaced in a user interface of an application/service. Processing operation 110 may comprise automatically surfacing, through a user interface of a productivity service, a transformation of a content portion as a template for insertion into a digital document. Examples of templatized transformations are illustrated in the examples provided in FIGS. 2A-2D.

As an example, an exemplary transformation that is surfaced (processing operation 110) may be a suggested modification of the at least one content portion, where the suggested modification is automatically surfaced for the user to select whether to implement an update to the digital document. In one example, a suggested modification notifies a user, of the productivity service, of the identified data inconsistencies and provides a user interface features for resolution. For instance, a user may have altered a header on one page of the digital document but not another, resulting in a suggested modification of the digital document.

A suggested modification may be presented along with an original content portion for the user to clearly identify how the transformation affects the digital document. In some instances, specific insights pertaining to transformation of data may be provided, to the user, through the user interface of the productivity service. In an alternate example, a surfaced data transformation may be automatically applied to a digital document of a productivity service. This may provide a user with a clear visual understanding of how a change affects a digital document. An exemplary productivity service may be configured to notify the user of the automatic update and provide a user with an opportunity to accept/reject the update. In other instances, a new version of the digital document may be created so as not to overwrite a previous version without user approval.

As indicated above, some examples may present, through a user interface of productivity service, a user with a chance to accept a data transformation. Flow of method 100 may proceed to decision operation 112, where it is determined whether user acceptance is received for an automatically surfaced data transformation. In examples where user acceptance is received, flow of decision operation 112 branches YES and processing of method 100 remains idle until subsequent processing is to occur. In examples where a prompt for user acceptance is provided but user acceptance is not received, flow of decision operation 112 branches NO. In such an instance, processing of method 100 may return to processing operation 108. For instance, additional input may be received from a user (e.g. further editing of a content portion). In such an example, processing may account for additional user input in a subsequent data transformation of a content portion.

FIGS. 2A-2D illustrate processing device views associated with user interface examples for suggestive transformation of content with which aspects of the present disclosure may be practiced. User interface examples are shown in association with exemplary productivity applications/services, where processing device views shown in FIGS. 2A-2D are front-end examples of processing operations described in method 100 (FIG. 1). Processing operations supporting the examples shown in FIGS. 2A-2D are described in the foregoing description of method 100 (FIG. 1).

Figure 2A:
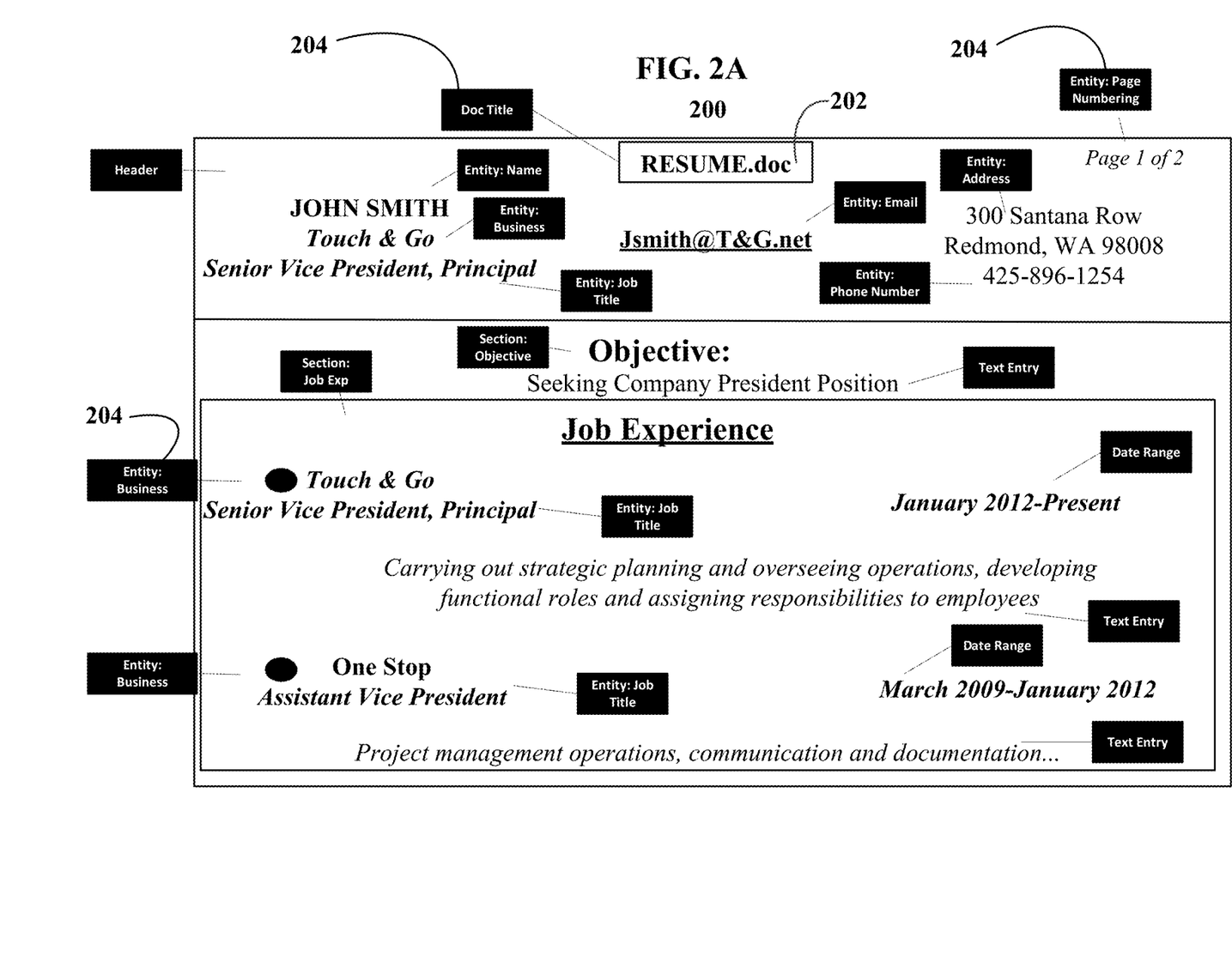
FIGS. 2A-2D illustrate exemplary processing device views associated with user interface examples for suggestive transformation of content with which aspects of the present disclosure may be practiced.

FIG. 2A illustrates processing device view 200, providing a display of a user interface for an exemplary productivity application/service. Within processing device view 200, a digital document 202 (e.g. Resume.doc) is presented within the user interface (UI) of the productivity application/service such as word processing service. Processing device view 200 illustrates examples of analysis of a digital document (e.g. processing operation 106 of FIG. 1). For instance, data structure and content of digital document may be analyzed, where data analytics 204 may be generated by an exemplary data transformation component (described in the foregoing description). Examples of data analytics 204 comprise data structures (e.g. document title, headers, sections, etc.) that identified along with entity data associated with specific data structures. Such data can be further analyzed by a model executed by the data transformation component for the generation of templatized data transformations (pertaining to one or more portions of a digital document).

Figure 2B:
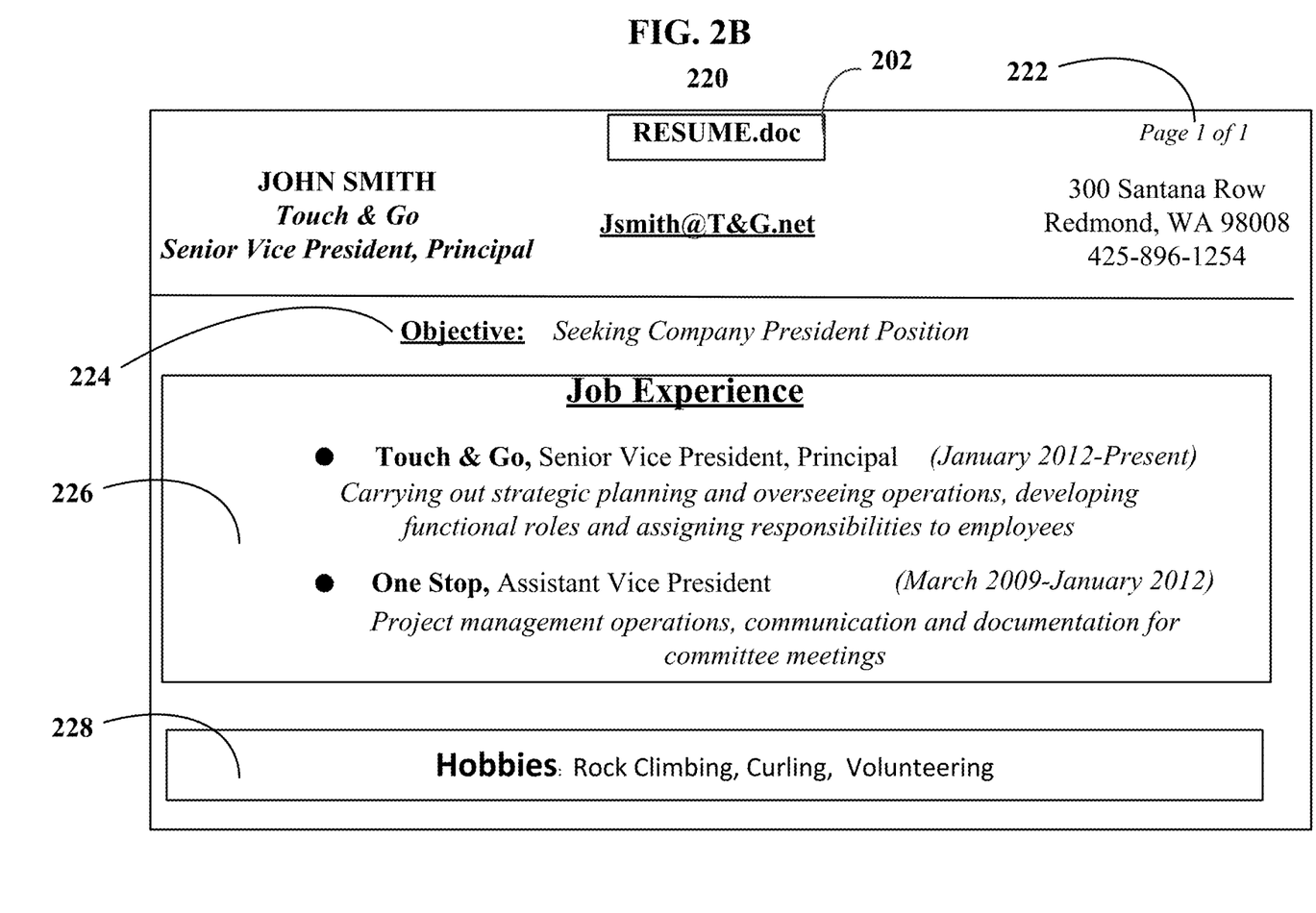

FIG. 2B illustrates processing device view 220, providing continued example of that shown in processing device view 200 (FIG. 2A). Processing device view 220 illustrates display of a user interface for an exemplary productivity application/service that comprises a data transformation to the digital document 202. Processing device view 220 illustrates a surfaced data transformation for the content portions of the digital document 202. For instance, when comparing processing device view 200 (FIG. 2A) with processing device view 220 (FIG. 2B), it is identified that portions of the digital document have been automatically transformed and displayed, on behalf of the user through, the user interface of the productivity service.

For instance, a first update 222 has adjusted formatting and layout of one or more portions to reduce a number of pages of the digital document 202 (in processing device view 200, the resume spilled over onto 2 pages and in processing device view 220 the resume has been re-formatted to fit on one page). A second update 224 has modified the formatting, layout and font of the objective section of the digital document. A third update 226 has updated formatting, layout and font of the job experience section, for example, re-arranging content that had wasted white space and spilled over onto multiple pages. A fourth update 228 has added a new hobbies section to the first page of the digital document 202. In one instance, the hobbies section may have been present on a second page of the digital document 202 before data transformation, where the data transformation adjusts multiple content portions to fit the hobbies section on the first page of the digital document 202. In some instances, results of modeling by an exemplary data transformation component may yield a determination to prioritize or de-prioritize a content portion, for example based on the specific type of digital document, other content portions included in the digital document and other factors such as an intended audience, among other examples. In another example, the fourth update 228 adds the hobbies section based on results of contextual analysis of the digital document executed by the data transformation component.

Figure 2C:
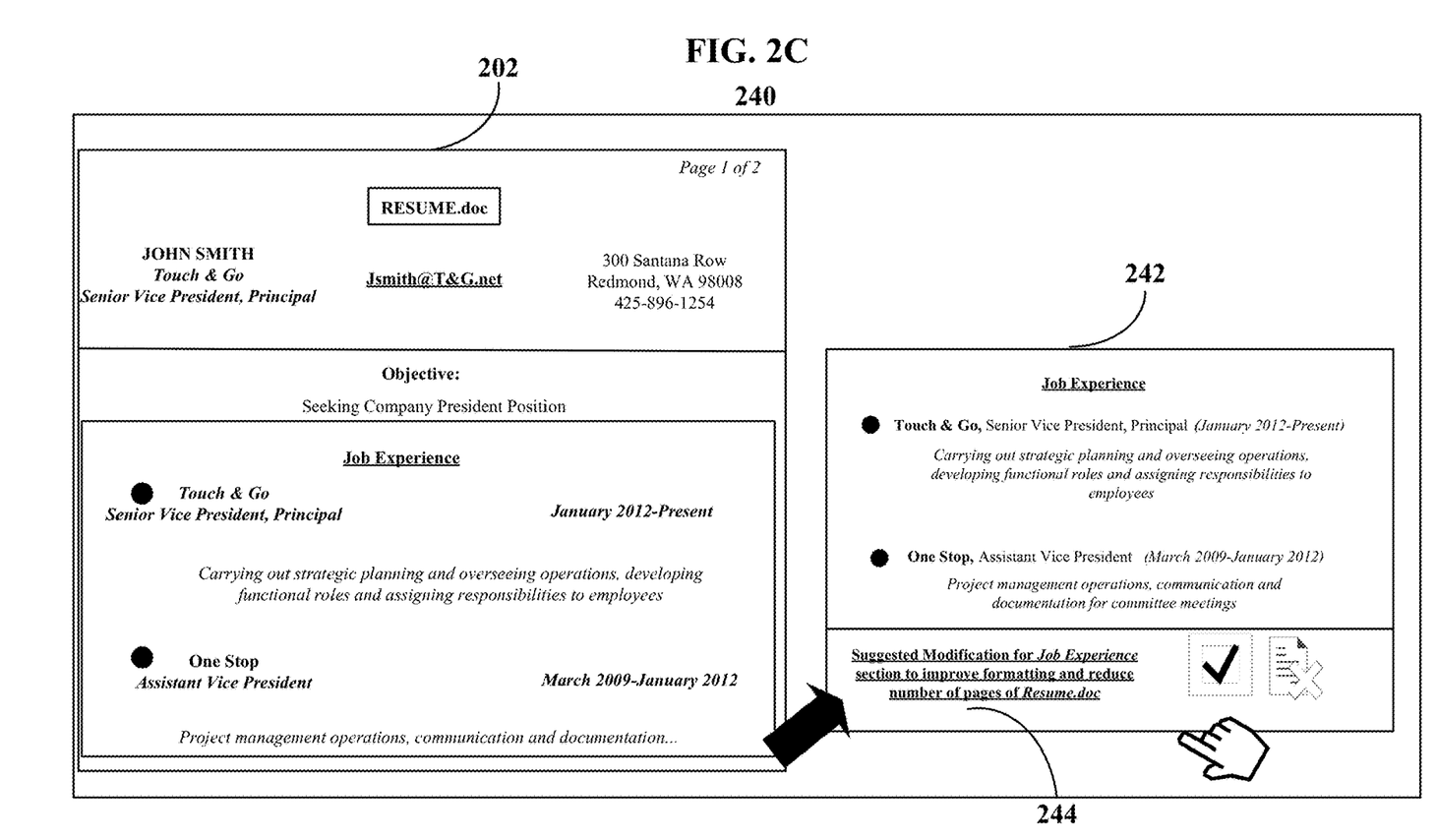

FIG. 2C illustrates processing device view 240, providing continued example of that shown in processing device view 200 (FIG. 2A). As can be seen in processing device 240, a suggested modification 242 is surfaced through a user interface of an exemplary productivity service (e.g. word processing service). The suggested modification 242 reformats content of the job experience section, for example, eliminating whitespace as well as modifying formatting, font and layout of the content portion. A user interface feature 244 for acceptance of the suggested modification 242 may be presented (to a user) through the user interface of the productivity service. In some examples, the user interface feature 244 (or another user interface feature) may be presented providing context alerting the user as to why the suggested modification 242 is presented. For example, user interface feature 244 identifies that a suggested modification of the job experience section is being presented to improve formatting of the section and reduce a number of pages of the digital document 202. A user may utilize the user interface feature 244 to quickly and efficiently accept or reject the suggested modification 242. In alternative examples, the user may take manual action (e.g. through device, voice input, touch input, etc.) to modify the suggested modification 242 or confirm acceptance/rejection of the suggested modification 242, among other examples.

Figure 2D:
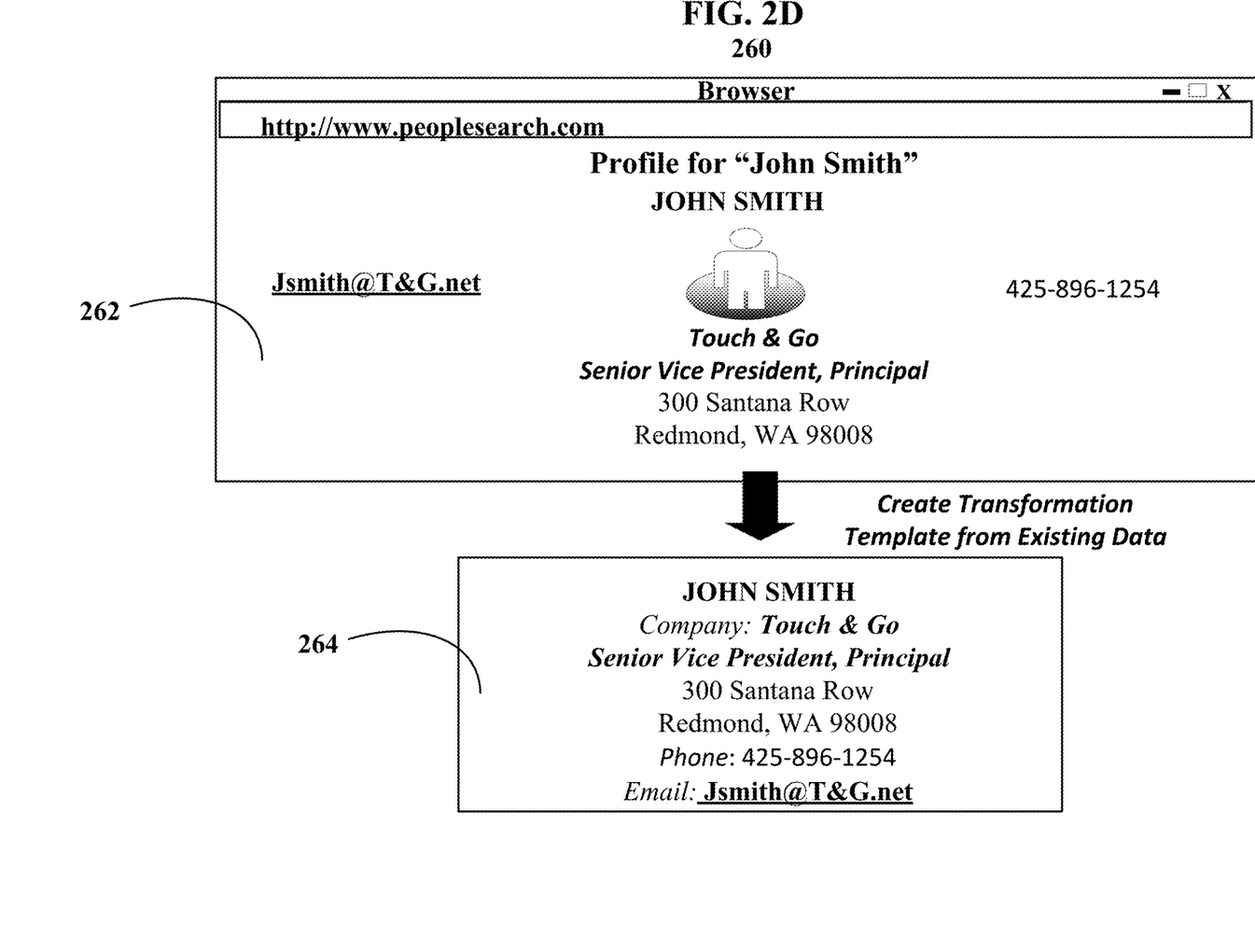

FIG. 2D illustrates processing device view 260, providing an alternative example of a templatized data transformation. In processing device view 260, a digital document 262 may be a user profile for a user (John Smith) that is being accessed via a productivity service such as web browser. The digital document 262 has various forms of data about the user. Processing device view 260 further illustrates a representation of a templatized data transformation 264 that is generated (e.g. by a data transformation component) from the digital document 262. An exemplary data transformation component may be configured to parse the digital document 262, identify, identify data structure and content portions, analyze the content portions and generated the templatized data transformation 264. The templatized data transformation 264 may be automatically inserted into a digital document, used in creation of a new digital document and/or available as a template for insertion into a digital document (e.g. manually by a user). In different instances, results of analysis of the digital document may yield determinations to manipulate specific content within a content portions, for example, converting the content between a flat representation and a rich data format. An exemplary data transformation component may be configured to select a most appropriate level of modification of a content portion based on a context of a digital document.

Figure 3:
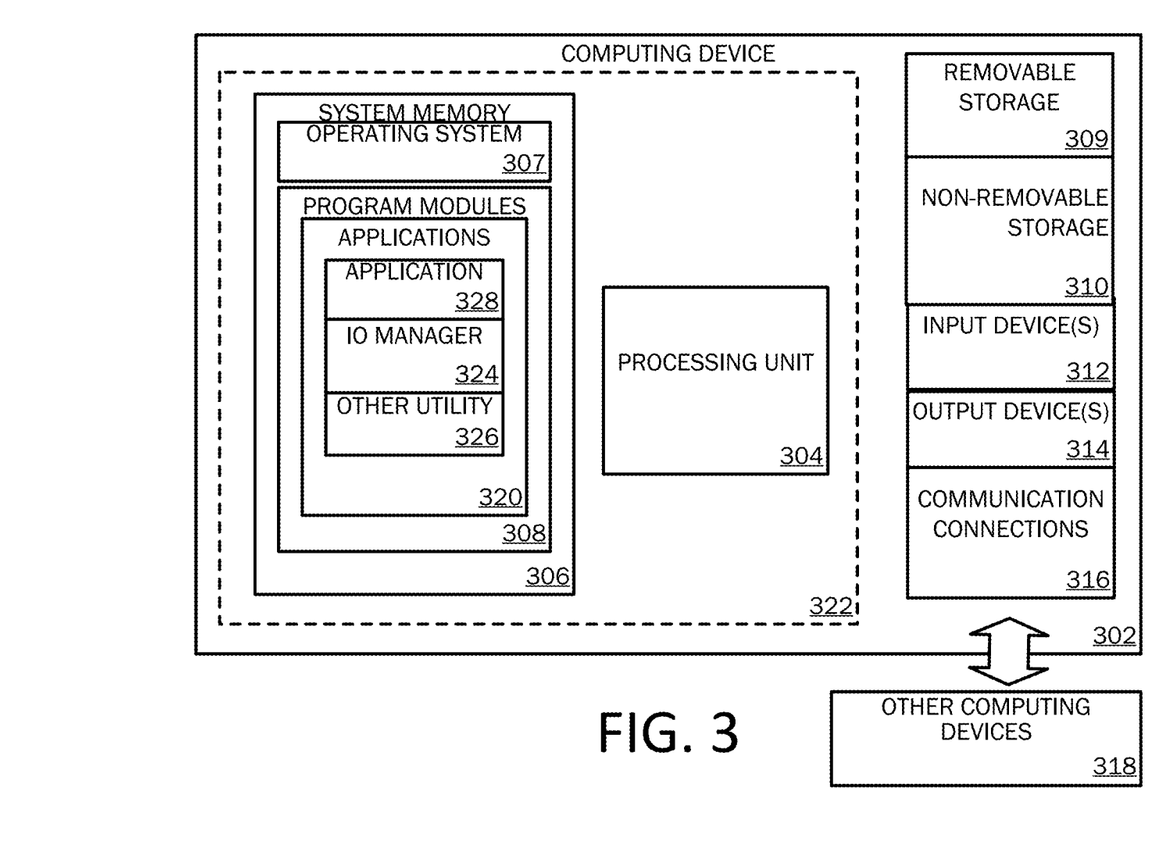
FIG. 3 is a block diagram illustrating an example of a computing device with which aspects of the present disclosure may be practiced.
Figure 4A:
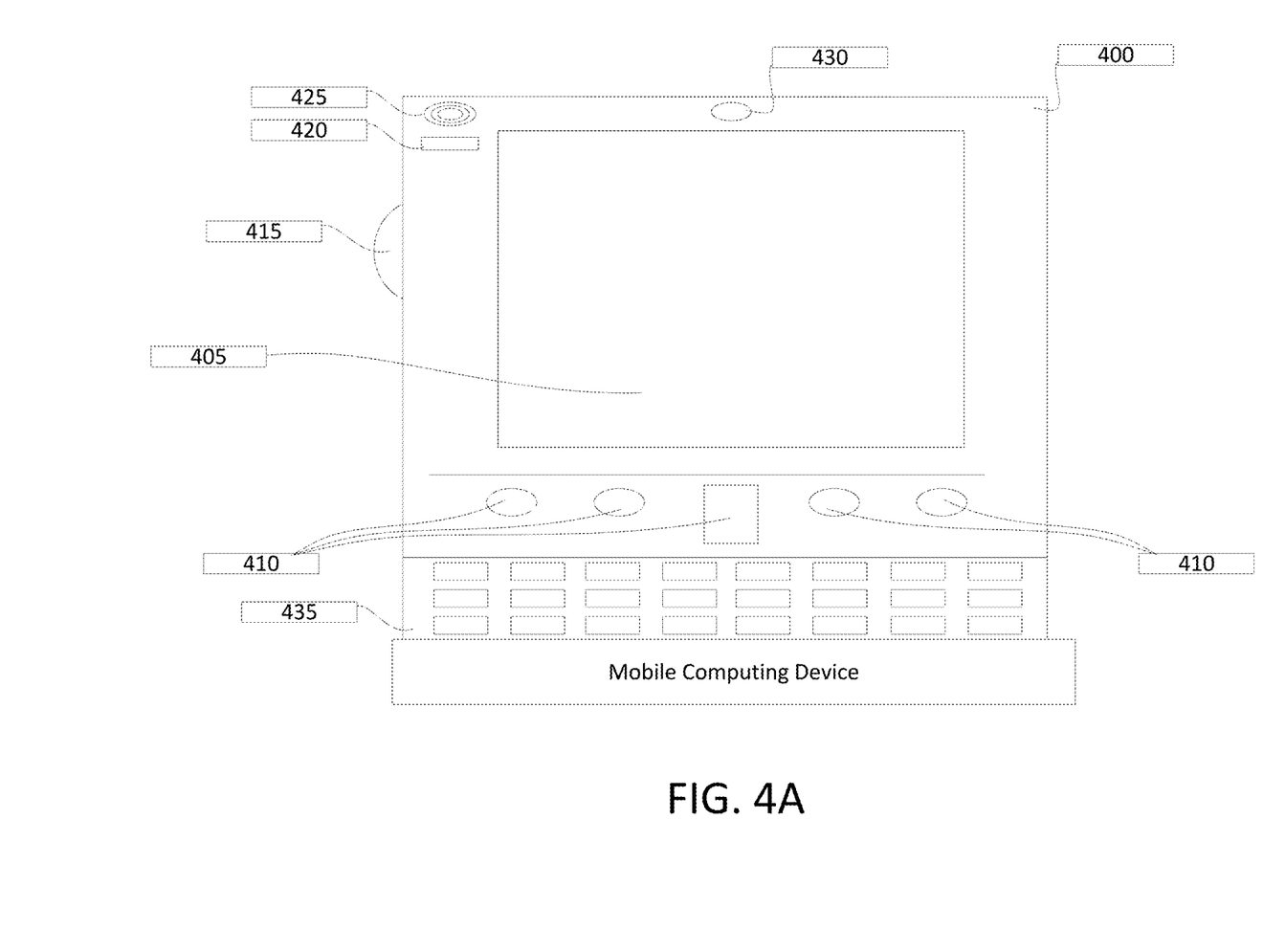
FIGS. 4A and 4B are simplified block diagrams of a mobile computing device with which aspects of the present disclosure may be practiced.
Figure 4B:
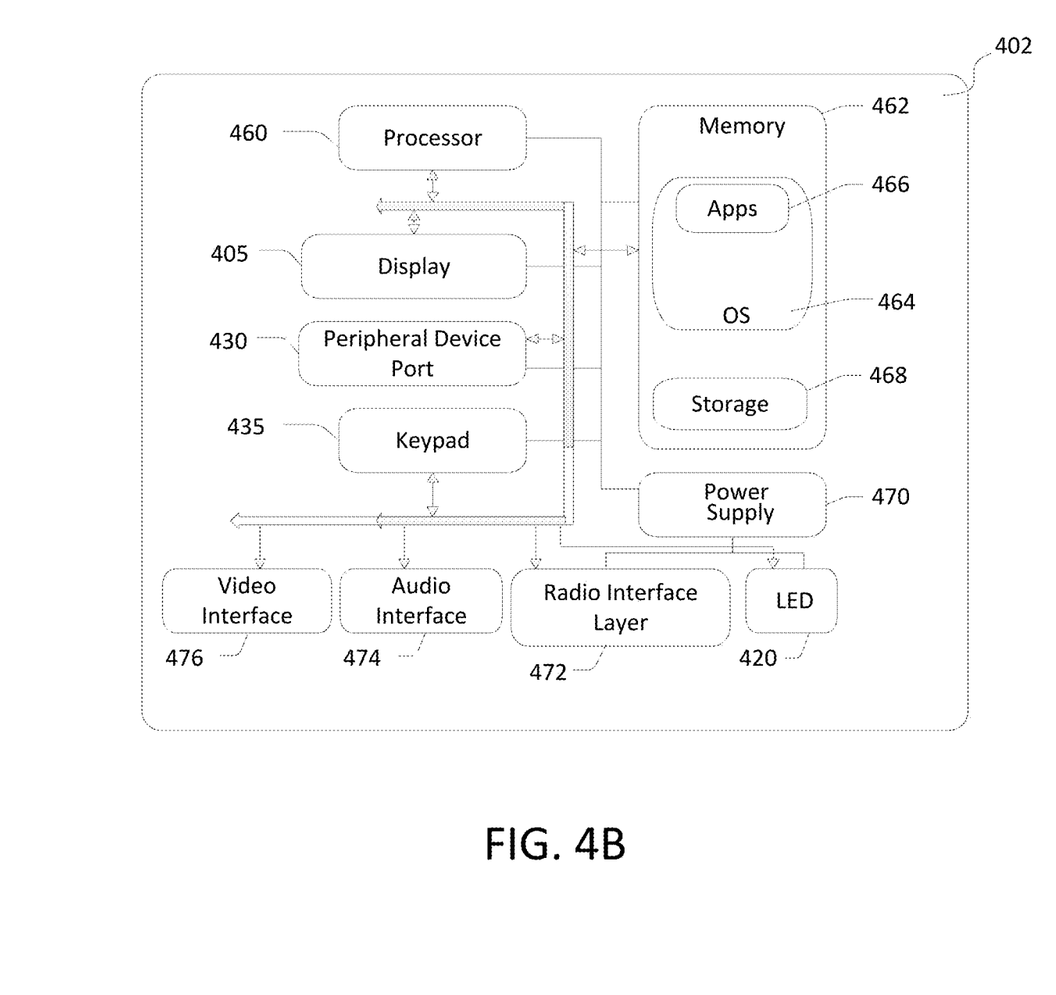
Figure 5:
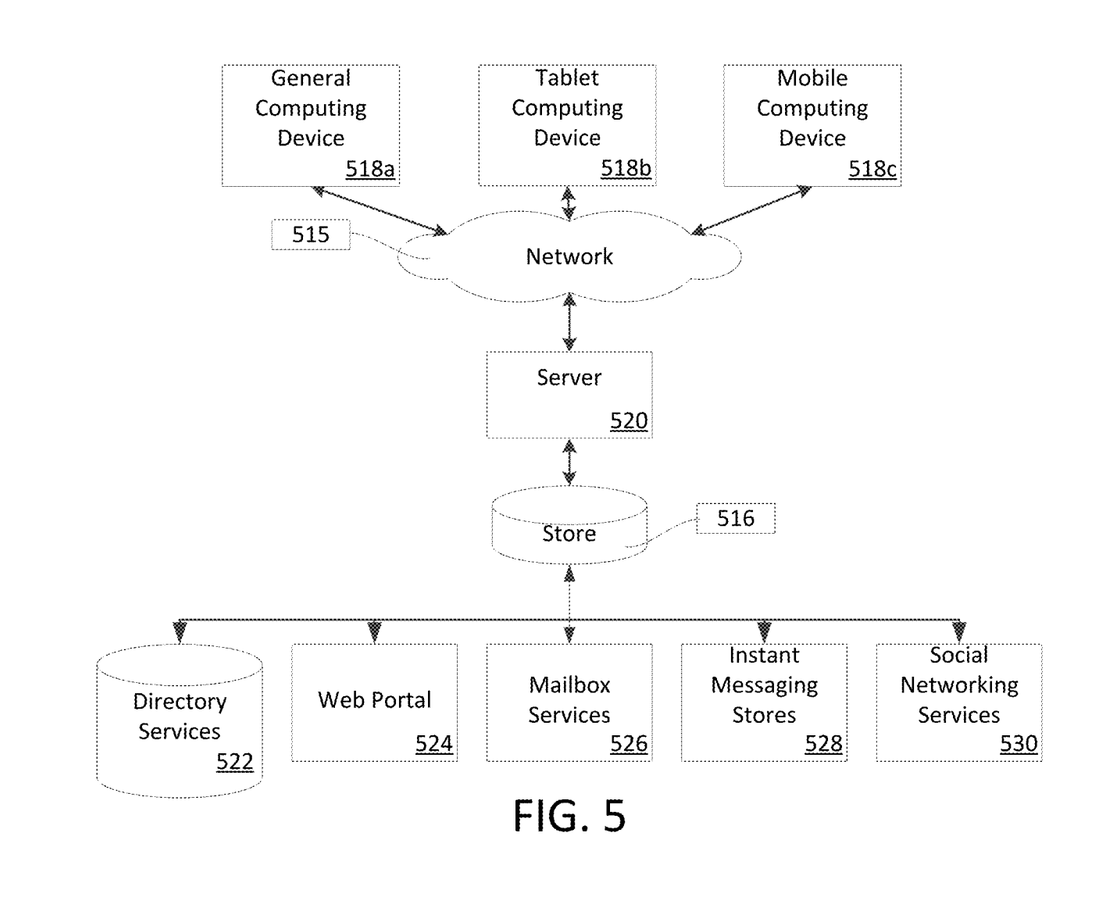
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for suggestive transformation of content for digital document usage as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for suggestive transformation of content for digital document usage as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for suggestive transformation of content for digital document usage as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A method comprising:
identifying a data structure of a digital document being presented through a user interface of a productivity service;
executing a trained data model configured to generate a templatized data transformation of content of the digital document, wherein the trained data model executes processing operations that comprise:

analyzing specific content portions associated with the identified data structure,     classifying an entity type of the digital document based on the data structure and an analysis of the specific content portions,     selecting, based on a relevance analysis of signal data associated with user access to other digital documents, a second digital document that is different from the digital document, wherein the relevance analysis is used to select the second digital document based on a correlation between the second digital document and a classification of the entity type of the digital document,     identifying, from the second digital document, one or more relevant content portions that relate to at least one of the specific content portions of the digital document,     generating a schema that transforms one or more content portions of the digital document to fit a context of the second digital document based on a result of analyzing, by the trained data model, a combination of: the identified data structure, the specific content portions of the digital document, the classification of the entity type of the digital document and the one or more relevant content portions of the second digital document, and     creating, based on the schema, an updated template for presentation of the digital document that comprises a data transformation of the one or more content portions of the digital document; and automatically surfacing, through the user interface concurrently with the digital document, the updated template showing the data transformation as a suggested modification in the digital document.

2. The method of claim 1, wherein the generating of the schema further comprises: identifying one or more sections of the digital document, parsing data associated with the one or more sections, tagging entities in the one or more sections, mapping content of the one or more sections to the tagged entities and the signal data identified from the one or more other applications or services, and selecting one or more modifications for the digital document based on the classification of the digital document and a result of the mapping of the content.

3. The method of claim 1, wherein the generating of the schema further comprises identifying data inconsistencies within the digital document, and wherein the suggested modification notifies a user, of the productivity service, of the identified data inconsistencies and provides a user interface features for resolution.

4. The method of claim 1, wherein the data transformation modifies a layout of the one or more content portions of the digital document.

5. The method of claim 1, wherein the data transformation modifies a layout of the one or more content portions of the digital document by changing a location of the one or more content portions relative to another content portion of the digital document.

6. The method of claim 1, wherein the other digital documents, analyzed in the relevance analysis, are accessed through one or more other applications or services that are different from the productivity service.

7. The method of claim 6, wherein the second digital document is concurrently accessed by a user along with the digital document.

8. A system comprising:

at least one processor; and a memory, operatively connected with the at least one processor, storing computer-executable instructions that, when executed by the at least one processor, causes the at least one processor to execute a method that comprises:

identifying a data structure of a digital document being presented through a user interface of a productivity service;

executing a trained data model configured to generate a templatized data transformation of content of the digital document, wherein the trained data model executes processing operations that comprise:

analyzing specific content portions associated with the identified data structure,         classifying an entity type of the digital document based on the data structure and an analysis of the specific content portions,         selecting, based on a relevance analysis of signal data associated with user access to other digital documents, a second digital document that is different from the digital document, wherein the relevance analysis is used to select the second digital document based on a correlation between the second digital document and a classification of the entity type of the digital document,         identifying, from the second digital document, one or more relevant content portions that relate to at least one of the specific content portions of the digital document,         generating a schema that transforms one or more content portions of the digital document to fit a context of the second digital document based on a result of analyzing, by the trained data model, a combination of: the identified data structure, the specific content portions of the digital document, the classification of the entity type of the digital document and the one or more relevant content portions of the second digital document, and         creating, based on the schema, an updated template for presentation of the digital document that comprises a data transformation of the one or more content portions of the digital document; and     automatically surfacing, through the user interface concurrently with the digital document, the updated template showing the data transformation as a suggested modification in the digital document.

9. The system of claim 8, wherein the generating of the schema further comprises: identifying one or more sections of the digital document, parsing data associated with the one or more sections, tagging entities in the one or more sections, mapping content of the one or more sections to the tagged entities and the signal data identified from the one or more other applications or services, and selecting one or more modifications for the digital document based on the classification of the digital document and a result of the mapping of the content.

10. The system of claim 8, wherein the generating of the schema further comprises identifying data inconsistencies within the digital document, and wherein the suggested modification notifies a user, of the productivity service, of the identified data inconsistencies and provides a user interface features for resolution.

11. The system of claim 8, wherein the data transformation modifies a layout of the one or more content portions of the digital document.

12. The system of claim 8, wherein the data transformation modifies a layout of the one or more content portions of the digital document by changing a location of the one or more content portions relative to another content portion of the digital document.

13. The system of claim 8, wherein the other digital documents, analyzed in the relevance analysis, are accessed through one or more other applications or services that are different from the productivity service.

14. The system of claim 13, wherein the second digital document is concurrently accessed by a user along with the digital document.

15. A computer-readable storage medium storing computer-executable instructions that, when executed by at least one processor, causes the at least one processor to execute a method comprising:
   identifying a data structure of a digital document being presented on a client computing device;
   executing a trained data model configured to generate a templatized data transformation of content of the digital document, wherein the trained data model executes processing operations that comprise:
      analyzing specific content portions associated with the identified data structure,
      classifying an entity type of the digital document based on the data structure and an analysis of the specific content portions,
      selecting, based on a relevance analysis of signal data associated with user access to other digital documents, a second digital document that is different from the digital document, wherein the relevance analysis is used to select the second digital document based on a correlation between the second digital document and a classification of the entity type of the digital document,
      identifying, from the second digital document, one or more relevant content portions that relate to at least one of the specific content portions of the digital document,
      generating a schema that transforms one or more content portions of the digital document to fit a context of the second digital document based on a result of analyzing, by the trained data model, a combination of: the identified data structure, the specific content portions of the digital document, the classification of the entity type of the digital document and the one or more relevant content portions of the second digital document, and
      creating, based on the schema, an updated template for presentation of the digital document that comprises a data transformation of the one or more content portions of the digital document; and
   transmitting, to the client computing device for presentation through a user interface concurrently with the digital document, data for rendering the updated template.

16. The computer-readable storage medium of claim 15, wherein the generating of the schema further comprises: identifying one or more sections of the digital document, parsing data associated with the one or more sections, tagging entities in the one or more sections, mapping content of the one or more sections to the tagged entities and the signal data identified from the one or more other applications or services, and selecting one or more modifications for the digital document based on the classification of the digital document and a result of the mapping of the content.

17. The computer-readable storage medium of claim 15, wherein the data transformation modifies a layout of the one or more content portions of the digital document.

18. The computer-readable storage medium of claim 15, wherein the data transformation modifies a layout of the one or more content portions of the digital document by changing a location of the one or more content portions relative to another content portion of the digital document.

19. The computer-readable storage medium of claim 15, wherein the other digital documents, analyzed in the relevance analysis, are accessed through one or more other applications or services that are different from a productivity service used to access the digital document.

20. The computer-readable storage medium of claim 19, wherein the second digital document is concurrently accessed via the client computing device along with the digital document.

* * * * *